United States Patent Office 2,715,387
Patented Aug. 16, 1955

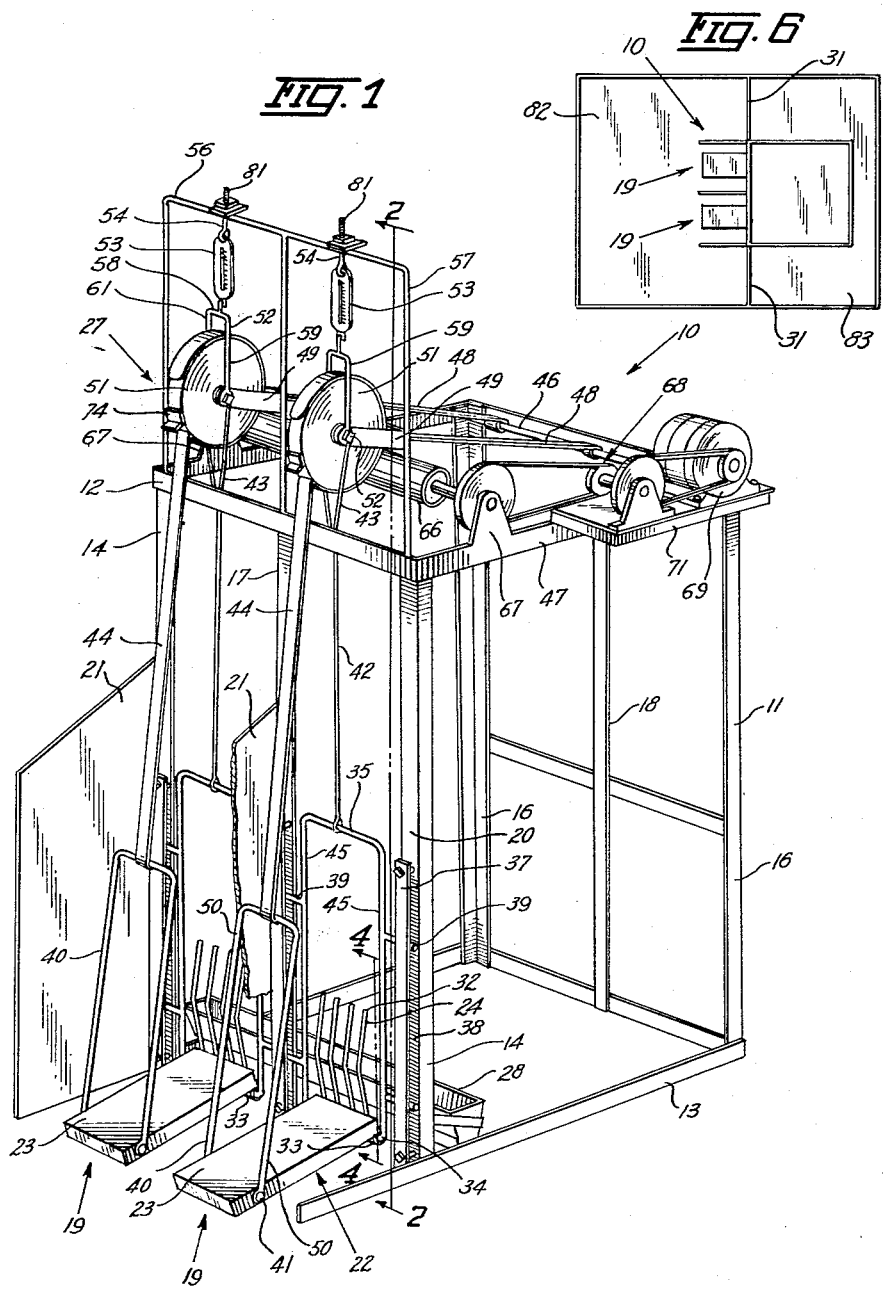

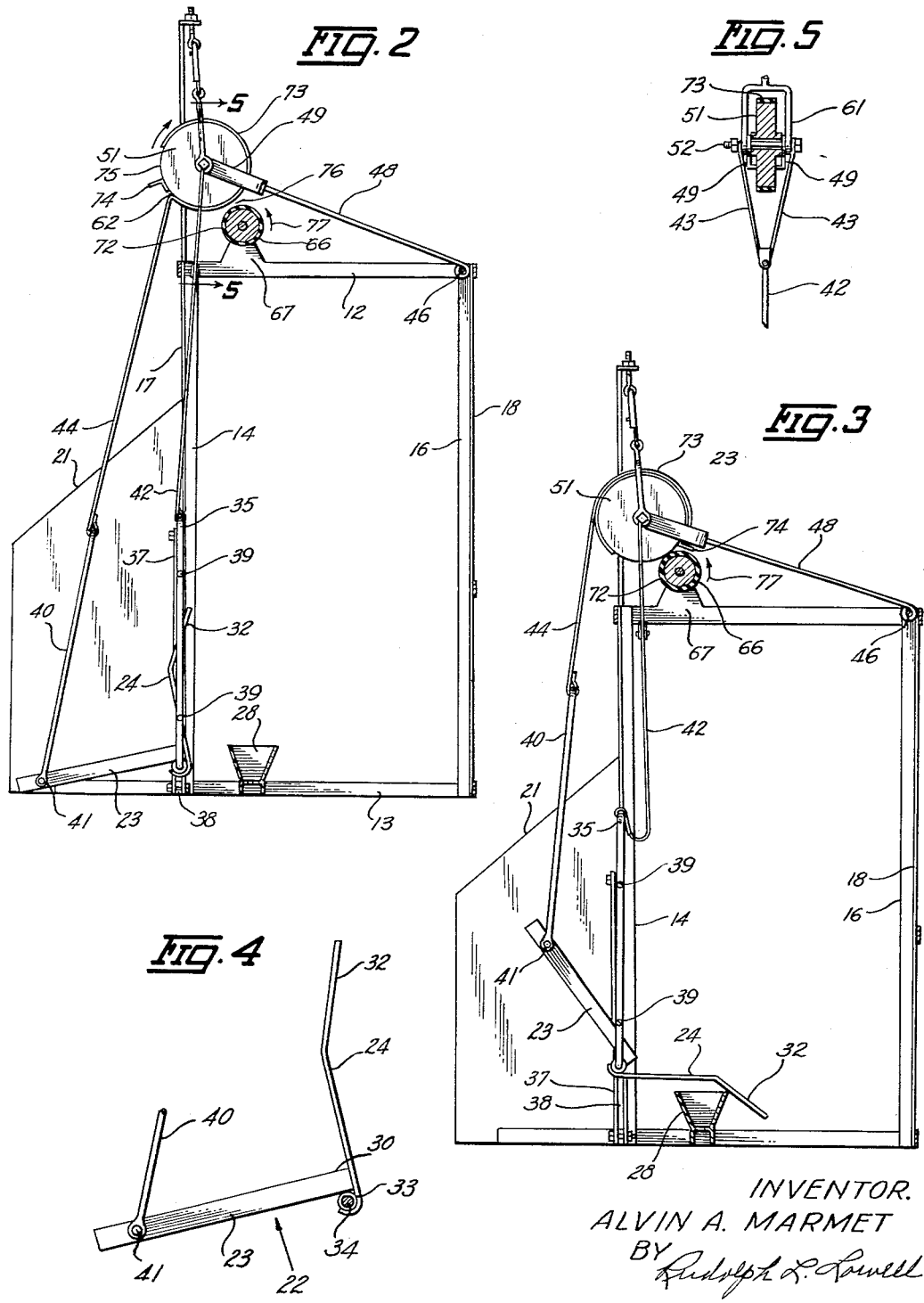

2,715,387

POULTRY SEPARATING DEVICE

Alvin A. Marmet, Des Moines, Iowa

Application October 5, 1953, Serial No. 384,192

2 Claims. (Cl. 119—155)

This invention relates generally to animal separating devices and more particularly to a device for topping chicken flocks, namely, separating from the flock chickens of a weight above a predetermined weight.

In the raising of chickens for frying or broiling purposes, the flock owner attempts to sell each chicken when it reaches a weight of from two and a half to three pounds. Once a chicken has attained such a weight, it represents a continuing economic loss to the owner, due to the fact that the weight increase of the chicken takes place at a rate which does not offset the feed cost. Further, chickens are most satisfactory for frying and broiling purposes at a weight of about two and a half to three pounds. It has been the practice to individually weigh and separate periodically, or as required, the larger chickens from a flock. Obviously, such a procedure is time consuming and inefficient.

An object of this invention, therefore, is to provide a device for automatically separating chickens of a weight above a predetermined weight from the remaining chickens in a flock.

A further object of this invention is to provide a chicken separating device which is placed within an enclosure, and which operates to automatically move the chickens above a predetermined weight to a separate portion of the enclosure, as such chickens grow to such weight.

Another object of this invention is to provide a chicken flock topping device which is rugged in construction, economical to manufacture, and automatic in operation.

Further objects, features and advantages of this invention will become apparent from a consideration of the following description when taken in connection with the accompanying drawing in which:

Fig. 1 is a perspective view of the flock separating device of this invention, with some parts broken away and other parts shown in section for the purpose of clarity;

Fig. 2 is a transverse sectional view of the separating device of this invention, as seen along the line 2—2 in Fig. 1 and showing the device in a set or initial operating position corresponding to a position when a chicken below a predetermined weight or no chicken is supported thereon;

Fig. 3 is a transverse sectional view of the separating device of this invention, illustrated similarly to Fig. 2, and showing the device in an operating position corresponding to a position therefor after a chicken above a predetermined weight has been moved by the device;

Fig. 4 is a detail sectional view as seen along the line 4—4 in Fig. 1;

Fig. 5 is a detail sectional view taken along the line 5—5 in Fig. 2; and

Fig. 6 is a diagrammatic view of the poultry separating device of this invention arranged within an enclosure for the poultry.

With reference to the drawing, the flock separating device of this invention, indicated generally as 10 in Fig. 1, includes a frame structure 11 having top and bottom frame sections 12 and 13, respectively, each of which is of a substantially rectangular shape. Legs or supports 14 and 16 are connected between the corners of the frame sections 12 and 13. Arranged between each pair of legs 14 and 16 and connected between the frame sections 12 and 13 are upright supports 17 and 18 respectively.

For the purpose of convenience, the legs 14 and 17 and their associated members on the upper and lower frame sections 12 and 13 will be referred to as the front frame section 20 of the frame structure 11. Likewise the legs 16 and 18 and corresponding members on the frame sections 12 and 13 will be referred to as the rear end of the frame structure 11.

Arranged forwardly of the frame structure 11 are chicken receiving stalls 19, illustrated as two in number, and formed by partition members 21 secured to and extended forwardly from the upright supports 14 and 17 at the front end of the frame structure 11. These stalls 19 constitute passageways for directing or guiding a chicken toward a feed box or water trough 28 positioned within the frame structure 11 rearwardly of the front frame section 20. Located within each stall or passageway 19 is a tipping device 22 which includes a chicken walk or treadle 23 provided at its rear end with a series of upright guard or stop members 24. The tipping devices 22 are operated by an actuating mechanism, indicated generally at 27, and carried on the top frame section 12 of the frame structure 11.

In use the frame structure 11 has the front frame section 20 thereof located within a fence section or partition wall 31 (Fig. 6) between a general chicken yard, indicated at 82, and a chicken pen 83 to receive separated chickens, such that the stalls 19 are located within the yard 82 for receiving the chickens to be topped or separated. As a chicken over a predetermined weight walks on a treadle 23, the same is tipped upwardly and rearwardly by the actuating mechanism 27, such that the guards 24 are disposed horizontally across the water trough 28 whereby the chicken is positively separated and moved from the flock into a separate pen. It can thus be seen that the tipping device 22 constitutes a chicken supporting or receiving unit for supporting the chicken during the movement of the same to the opposite side of the trough 28. On completion of the separating operation, a treadle 23 automatically returns to its set or initial position in a stall 19 to receive another chicken.

Since each tipping device 22 is of a like construction and similarly operated within a stall 19, only one of such devices will be described in detail.

The guard or stop members 24 at the rear end of the treadle member 23 are elongated rod members, illustrated as being four in number, arranged in a side by side spaced relation in a plane substantially normal to the plane of the treadle 23. The top end portions 32 (Figs. 2 and 4) of the guard members 24 are inclined rearwardly relative to the bottom portions thereof in the set or initial position of the device shown in Fig. 2, for a purpose to appear later. The lower ends of the guard members 24 terminate at a position adjacent the under side of the treadle or support 23 and are welded to a transversely extended tube 33 secured to the treadle 23 adjacent the rear end 30 thereof.

The rear end 30 of a treadle 23 is suspended on a first inverted U-shape rod member 35 the legs 45 of which are positioned in a straddling relation with the rear end 30 of the treadle 23. The free ends 34 of the legs 45 are extended inwardly toward each other for reception within the opposite ends of the tube 33. Thus, the treadle 23 and its associated guards 24 are pivotally movable in a vertical plane about the lower ends 34 of the U-member 35. Each leg 45 has a pair of outwardly projected lateral extensions 39 for a purpose to appear later.

A second U-member 40, of a size corresponding substantially to the size of the first U-member 35, has the legs 50 thereof positioned in a straddling relation with the front end of the treadle member 23 and pivotally connected to opposite sides of the treadle 23 by pivots 41. These inverted U-members 35 and 40 are connected by members 42 and 44, respectively, with the treadle actuating mechanism 27, which will now be described.

The actuating mechanism 27 includes a pivot shaft 46 (Fig. 1) extended transversely of the frame structure 11 and supported in the side members 47 of the top frame section 12 at the rear end of the frame structure. Rotatably mounted on the pivot shaft 46 are the rear ends of a pair of upwardly and forwardly inclined elongated arms 48, the front ends of which terminate in pairs of transversely spaced legs or bearing members 49. Arranged between each pair of legs 49 so as to be positioned directly above a corresponding chicken receiving stall 19 is a disc or friction gear 51, the shaft 52 for which is supported on the legs 49.

The front end of each pivoted arm 48 is yieldably supported for up and down movement by means including a spring or resilient member 53, such as a spring scale, connected at its upper end 54 to a cross support 56 forming part of an upright transverse frame 57 secured to the top frame section 12 at the front end of the frame structure 11. The lower end of the spring 53 is secured to the base 58 of an inverted U-member 59, having the legs 61 thereof straddling the corresponding gear 51 and connected to the shaft 52 for the gear 51.

Connected to the shaft 52 outwardly of the bearings 49 are the diverged branches 43 of the flexible connecting member or cable 42 which is secured at its lower end to the base of U-member 35. It can thus be seen that the U-member 35 and its associated tipping device 22 are suspended by the cable 42 from the shaft 52 for the corresponding gear 51.

The U-member 40 is connected to the corresponding gear 51 by an elongated flexible strap member 44 which is connected to and extended between the base section of the member 40 and the periphery of the gear 51 at a position indicated at 62.

By virtue of this connection of the U-member 40 and the periphery of the gear 51, it can be seen from Figs. 2 and 3 that upon rotation of the gear 51 in a clockwise direction as viewed in Figs. 2 and 3, the strap 44 is wound about the periphery of the gear so as to tip or swing the treadle member 23 upwardly and forwardly. As shown in Fig. 3, the treadle 23 and its associated guards 24 are also lifted or raised relative to the set or ground supported position of the treadle member 27 as shown in Fig. 2, by virtue of this winding of the strap 44 on the gear 51.

For rotating the gear 51, to accomplish this winding of the strap 44 on the gear 51, there is provided an elongated friction drive gear or roller 66 which extends transversely of the supporting structure 11 and is journaled at its ends on upright ears 67 extended upwardly from the side members 47 for the top frame section 12. As best appears in Fig. 2, the roller 66 is located slightly below and rearwardly of the gears 51, in the set position of the device shown in Figs. 1 and 2 so that upon downward movement of a gear 51 and its associated supporting arm 48 about the pivot 19 therefor, the periphery of the gear 51 contacts the roller 66 so as to be driven or rotated thereby. The roller 66 is driven by a belt and pulley system indicated generally at 68, and operated by an electric motor 69 supported on a member 71 carried by the top frame section 12.

The roller 66 (Figs. 2 and 3) is provided with an outer covering 72 (Figs. 2 and 3) of rubber or the like, and the periphery of the gears 51 are provided with a similar covering 73 over a portion of the surfaces thereof. A portion 75, however, of the peripheral surface of each gear 51, which is preferably constructed of metal or the like, is left uncovered by the rubber covering 73. At one end of such portion 75 an outwardly projected stop 74 is provided for a purpose to appear later.

In the operation of the device 10, the spaces 76 between the gears 51 and the drive roller 66 (Fig. 2) is adjusted by manipulation of the spring scale devices 53 to provide for chickens above a predetermined weight being topped or separated from the flock.

Assume that the scale 53 has been adjusted to provide for chickens above a weight of three pounds being separated and that the motor 69 has been started so that the drive gear 66 is rotating counterclockwise as viewed in Figs. 2 and 3 and as indicated by the arrows 77. With the device in its set position illustrated in Figs. 1 and 2, assume that a chicken weighing less than three pounds approaches the device 10 to feed from the trough 28. The chicken advances upwardly along one of the treadles 23 until it reaches a position at which it can feed from the trough 28 by moving its head and neck between a pair of adjacent guards 24 on the treadle 23. By virtue of the suspension of the front end of the treadle 23 from the shaft 52 for the corresponding gear 51, the weight of the chicken on the treadle 23 causes such gear 51 to move downwardly about the pivot 46 for the gear supporting arm 48. However, by virtue of the adjustment of the spring scale device 53 to provide for the separation of chickens weighing over three pounds, the weight of this lighter chicken on the treadle 23 is insufficient to move the gear 51 downwardly into contact with the drive roller 66. Thus such chicken is free to feed from the trough 28 and walk downwardly off the treadle 23 to rejoin the chicken flock.

Now assume that a chicken weighing over three pounds approaches the device 10 to feed from the trough 28, and moves upwardly along one of the treadles 23 toward the trough 28. The gear 51 corresponding to such treadle 23 is moved downwardly by virtue of the weight of the chicken on the treadle 23 acting on the shaft 52 for the gear 51 being sufficiently great to move the periphery of the gear 51 into contact with the rubber covering 72 on the drive roller 66. This frictional contact of the rubber covering for the contacting gear 51 and roller 66 rotates the gear 51 in a clockwise direction as viewed in Figs. 2 and 3.

As best appears in Fig. 3, this clockwise rotation of the gear 51 causes a clockwise tipping movement of the corresponding tipping device 22 about the inwardly projected ends 34 of the U-member 35 by virtue of the strap 44 being wrapped or wound about the periphery of the gear 51. Also, and as best appears in Fig. 3, the strap 44 is wrapped sufficiently about the periphery of the gear 51 to lift the entire tipping device 22. During this lifting movement of the device 22, the treadle rear end 30 moves in a substantially vertical direction as a result of the transverse projections 39 on the U-member 35 being positioned in vertically extended guideways 38 formed between the upright front frame members 14 and 17 and upright guide members 37 attached to the members 14 and 17 in a forwardly spaced relation.

In the position of the tipping device 22 shown in Fig. 3 the chicken is more or less dumped or forced to walk along the guards 24 to the opposite side of the trough 28. As best appears in Fig. 3, the configuration of the guards 24 with the inclined upper end portions 32 facilitates this travel of the chicken across the trough 28.

It can be seen that, the clockwise rotation of the gear 51 is continuous while the rubber covering 73 therefor is in contact with the rubber surface 72 for the drive roller 66 as a result of the frictional gripping action between the adjacent rubber surfaces. However, any frictional action between the uncovered peripheral portion 75 of the gear 51 and the drive gear 66 is insufficient to maintain this continuous rotation of the gear 51. Therefore, when the gear 51 has been rotated to a position in which the portion 75 thereof contacts the drive gear covering 72, the gear 51 merely slips on the drive gear 66 to thereby transmit a jumping or jiggling motion to the treadle 23 and its associated guards 24. This jumping of the tipping device 22 further facilitates the removal of the chicken from the device 22, since it is difficult for the chicken to maintain a set position on the device 22.

The stop 74 positively prevents rotation of the gear 51 past a position in which the stop 74 contacts the drive roller 66. Thus should the weight of a heavy chicken be sufficient to cause rotation of the gear 51, when the peripheral portion 75 thereof is in contact with the drive gear 66, a similar jiggling or jumping action is transmitted to the tipping device 22 as a result of the contact of the stop 74 with the drive roller 66.

Immediately upon removal of the chicken from the guards 24, the gear 51 is moved upwardly, by the action of the spring scale device 53 to a position out of contact with the drive roller 66. The weight of the treadle 23 rotates the gear 51 in a counterclockwise direction, as viewed in Fig. 3, until the treadle 23 has returned to its ground supported position.

From the foregoing description it is seen that this invention provides a chicken separating or topping device 10 which automatically separates chickens above a predetermined weight from the other chickens in a flock. The spring scale devices 53 are adjustable to provide for the topping of chickens of any predetermined weight by manipulation of a pair of bolts 81 which connect the scales 53 with the cross support 56. The scales 53 are preferably calibrated so as to indicate directly the critical weight for the chickens to be topped.

While the device has been described in detail relative to the separating of chickens, it is to be understood that the device may be used for any form of poultry, and similar devices may be constructed for the classification according to weight of other animals.

Although the invention has been described with respect to a preferred embodiment thereof, it is to be understood that it is not to be so limited since changes can be made therein which are within the full intended scope of this invention as defined by the appended claims.

I claim:

1. A chicken separating device comprising an upright frame, a chicken receiving unit carried by said frame and extended from one side thereof, a friction gear yieldably supported on said frame at a position above said receiving unit, a rotatable drive roller carried by said frame at a position such that the peripheral surface thereof is adjacent the peripheral surface of said friction gear, means attached to and extended between the receiving unit and said friction gear for yieldably moving the peripheral surface thereof into engagement with the peripheral surface of said drive roller when the weight of a chicken on said chicken receiving unit exceeds a predetermined weight, whereby to rotate said friction gear, and means operatively associated with said friction gear and said receiving unit for moving the chicken on the receiving unit to the opposite side of said frame in response to such rotation of said friction gear.

2. A chicken separating device comprising an upright frame, a rotatable disk assembly carried by said frame, for yieldable up and down movement, a chicken receiving unit having the opposite ends thereof suspended from said assembly and extended longitudinally of said frame, so that one end of the receiving unit is positioned to one side of said frame, a flexible means connected to and extended between said one end of said receiving unit and the periphery of the disc in said assembly, and means for rotating said disc on a downward movement of said assembly in response to the weight of a chicken on said receiving unit, whereby said flexible means is wound about said disc to thereby raise said one end of said receiving unit and tip said unit so as to move a chicken thereon to the opposite side of said frame.

References Cited in the file of this patent

UNITED STATES PATENTS

| | | |
|---|---|---|
| 1,994,550 | Watson | Mar. 19, 1935 |
| 2,364,832 | Weckerly | Dec. 12, 1944 |
| 2,508,796 | Pekar | May 23, 1950 |
| 2,515,063 | Stanchfield | July 11, 1950 |